United States Patent [19]
Kallin et al.

[11] Patent Number: 5,293,641
[45] Date of Patent: Mar. 8, 1994

[54] SIGNAL STRENGTH CONTROLLED DIRECTED RETRY IN A MOBILE RADIOTELEPHONE SYSTEM

[75] Inventors: Harald Kallin, Sollentuna; Roland S. Bodin, Spanga, both of Sweden

[73] Assignee: Telefonaktiebolaget L M Ericsson, Stockholm, Sweden

[21] Appl. No.: 770,487

[22] Filed: Oct. 3, 1991

[51] Int. Cl.$^5$ .......................... H04Q 7/00; H04B 7/26
[52] U.S. Cl. ..................................... 455/33.1; 379/59; 455/34.1; 455/54.2; 455/58.2; 455/63
[58] Field of Search .......................... 455/33.1–33.4, 455/34.1, 34.2, 53.1, 54.1, 54.2, 56.1, 62, 63, 67.1, 58.1, 58.2; 379/50, 60, 63

[56] References Cited
U.S. PATENT DOCUMENTS

| | | | |
|---|---|---|---|
| 3,913,017 | 10/1975 | Imaseki | 455/33/.4 |
| 4,669,107 | 5/1987 | Eriksson-Lennartsson | 379/60 |
| 4,670,899 | 6/1987 | Brody et al. | 379/60 |
| 4,718,081 | 1/1988 | Brenig | 379/60 |
| 4,775,999 | 10/1988 | Williams | 379/59 |
| 4,829,554 | 5/1989 | Barnes et al. | 379/58 |
| 4,893,327 | 1/1990 | Stern et al. | 379/59 |

*Primary Examiner*—James L. Dwyer
*Assistant Examiner*—Chi Pham
*Attorney, Agent, or Firm*—Burns, Doane, Swecker & Mathis

[57] ABSTRACT

In a mobile radiotelephone system, a base station, upon receiving a service request from a mobile station, ascertains whether the service request can be accepted according to the availability of voice channels in the base station, and, if the service request cannot be accepted, compares a measured signal strength of the service request with at least one threshold value. If the signal strength exceeds the threshold, the mobile station is directed to retry the service request on one or more of a first set of channels assigned to neighboring base stations. Otherwise, the mobile station is directed to retry the service request on one or more of at least a second set of channels assigned to neighboring base stations. Accordingly, directed retries nearer the interior of a cell may be restricted or eliminated, whereas directed retries toward the periphery of the cell may be freely allowed or less severely restricted. Since interference is greater from mobile stations transmitting nearer the interior of a cell on the frequency of an adjacent cell than from such mobile stations transmitting from the periphery of the cell, interference is therefore reduced.

19 Claims, 5 Drawing Sheets

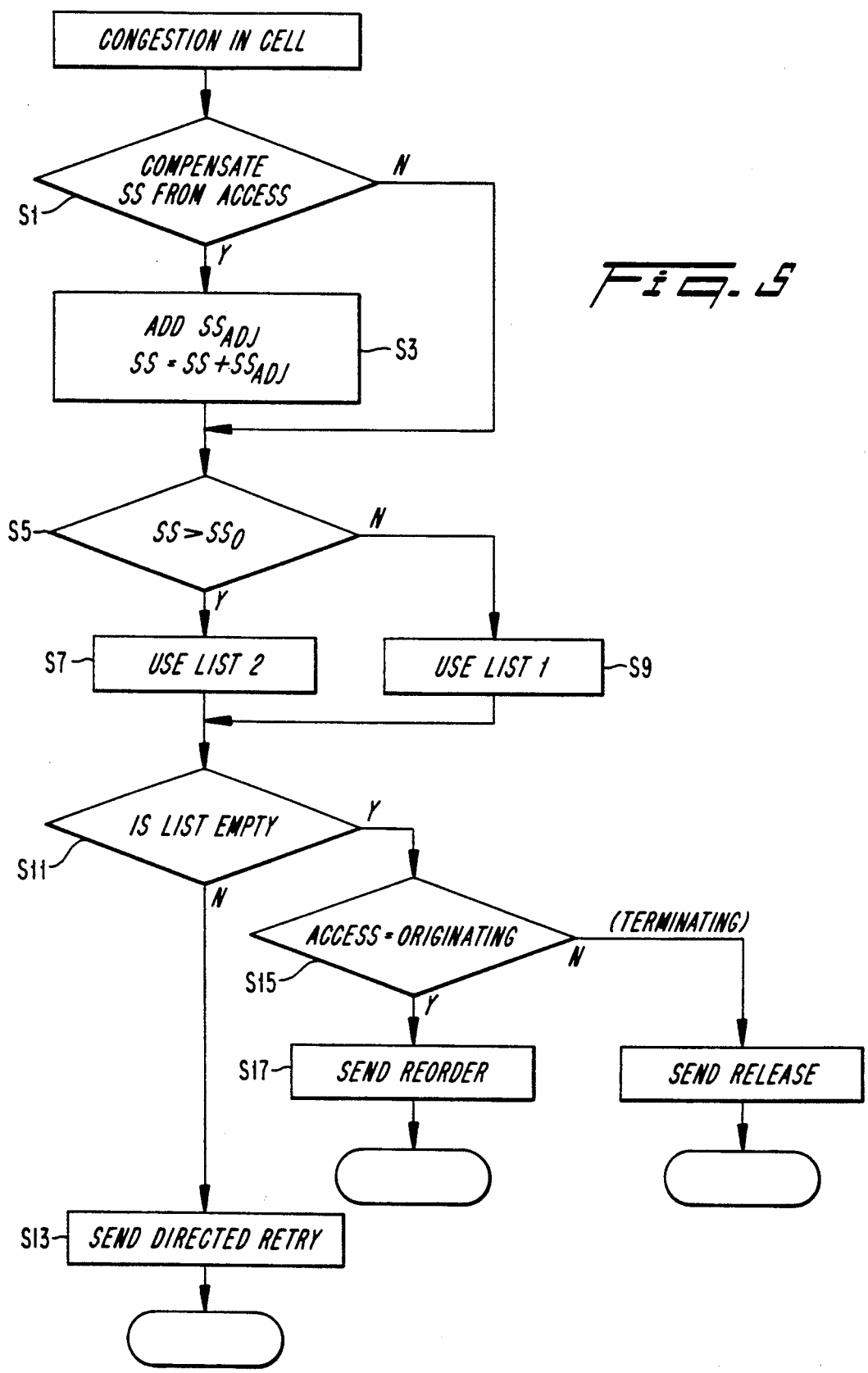

SIGNAL STRENGTH CONTROLLED DIRECTED RETRY IN A MOBILE RADIOTELEPHONE SYSTEM

BACKGROUND OF THE INVENTION

The present invention relates to interference reduction in a cellular mobile radiotelephone system and more particularly to reduction of interference in such a system resulting from a conventional, unrestricted directed retry function.

In mobile radiotelephone systems, one of the main technological challenges is to provide a sufficiently large number of radio channels to meet system demand while at the same time minimizing interference of those channels with one another. In cellular mobile radiotelephone systems, this problem has been addressed by allocating frequencies to cells according to a frequency reuse pattern such that a specified distance, known as the frequency reuse distance, separates geographical areas using a common frequency. Referring to FIG. 1, for example, cells $A_1$ through $A_7$ in the lower left-hand cluster of cells each use different sets of frequencies. The same frequencies can be repeated some distance away as in the cluster to the upper right having cells $B_1$ through $B_7$. Cell $B_4$ could use one or more of the same frequencies as cell $A_4$, and so forth. Mobile stations normally served in cell $A_4$ cause some interference at the base station and mobile stations in cell $B_4$, and vice versa. Such interference is usually minimal and is measured by comparing the level of interference to the effective signal level at the base station or mobile station being interfered with to yield a C/I (carrier-to-interference) ratio. The technique of frequency reuse has proven effective in preventing undue interference of same-frequency channels.

A problem arises, however, when a call access is attempted at a time when all of a cell's voice channels available for the call are occupied (cell congestion). The typical response to such a situation is for the mobile switching center MSC to send a directed retry instruction to the mobile station attempting access together with a list of the frequencies of the control channels of all of the congested cell's neighboring cells. A directed retry instruction essentially informs the mobile station attempting to access the mobile radiotelephone system that access is not available through a cell just tried, but instructs the mobile stations to attempt access again through one of a number of different neighboring cells.

Since no connection of the mobile station to the radiotelephone system across a traffic channel has yet been established, there has been no substantial opportunity for the location of the mobile station relative to cell boundaries to be determined within the radiotelephone system. Such location may be determined, for example, by monitoring the strength of transmissions by the mobile station at several different cell sites. When the location of the mobile station is known, the MSC may direct the mobile station to reattempt access through a particular designated cell. Instead, the mobile station monitors reception on each of the neighboring cell's frequencies and chooses a strongest received frequency across which to reattempt access.

Given a flat topography, the frequency chosen will usually be that of the neighboring cell closest to the mobile station. Because of varying topography, however, the propagation paths and resulting signals strengths may be varied such that the strongest received channel may not always be that of the closest neighboring cell but rather may be that of a more distant neighboring cell. In this latter situation, the potential for interference increases.

A mobile station M in FIG. 1, for example, would normally access and be served by cell $A_7$ but might be directed to cell $A_4$ if cell $A_7$ is congested. If the mobile station M sets up the call in cell $A_4$, the mobile station is farther away from cell $A_4$ than most mobile stations served by cell $A_4$. The distance to the closest interferer, cell $B_4$, is shorter than normal. The result is a reduced C/I ratio for the mobile station M and possibly also for a call handled in cell $B_4$.

A further source of interference is adjacent channel disturbance which may occur when adjacent cells use two frequencies that, although different, are close to one another. Because filtering techniques do not provide perfect attenuation of adjacent frequencies, some energy at an adjacent frequency will pass through the channel filters and cause interference characterized by a C/A (carrier-to-adjacent) ratio. In FIG. 1, if the mobile station M received service from cell $A_4$ on a frequency f as a result of directed retry, and if cell $A_7$ used frequency $f+1$ or $f-1$ at the same time, then the mobile station would both experience and cause interference. Such interference becomes more widespread the farther toward the interior of the cell the mobile station is because the mobile station's signal is stronger over a greater portion of the cell. If the mobile is at the cell border, interference is less.

To overcome the foregoing problems it would be desirable to have the capability of treating overflow new call access requests according to the potential of the mobile station for causing disruptive interference. In particular, it would be desirable to restrict the directed retry function with respect to mobile stations near the interior of a congested cell.

SUMMARY OF THE INVENTION

According to the present invention, a base station, upon receiving a service request (in particular a new call access request) from a mobile station, ascertains whether the service request can be accepted, and, if the service request cannot be accepted, compares a measured signal strength of the service request with at least one threshold value. If the signal strength exceeds the threshold, the mobile station is directed to retry the service request on one or more of a first set of channels. Otherwise, the mobile station is directed to retry the service request on one or more of at least a second set of channels. Accordingly, directed retries near the interior of a cell may be restricted or eliminated, whereas directed retries toward the periphery of the cell may be freely allowed or less severely restricted. Since interference is greater from mobile stations transmitting near the interior of a cell on the frequency of an adjacent cell than from such mobile stations transmitting from the periphery of the cell, interference is therefore reduced.

BRIEF DESCRIPTION OF THE DRAWINGS

These and other features and advantages of the invention will be readily apparent to one of ordinary skill in the art from the following written description read in conjunction with the drawings, in which:

FIG. 5 is a flowchart of a routine executed by the switching center (MSC) of FIG. 3 in the case of cell congestion which may be used to implement the present invention.

DETAILED DESCRIPTION OF THE PREFERRED EMBODIMENTS

Figure 2:
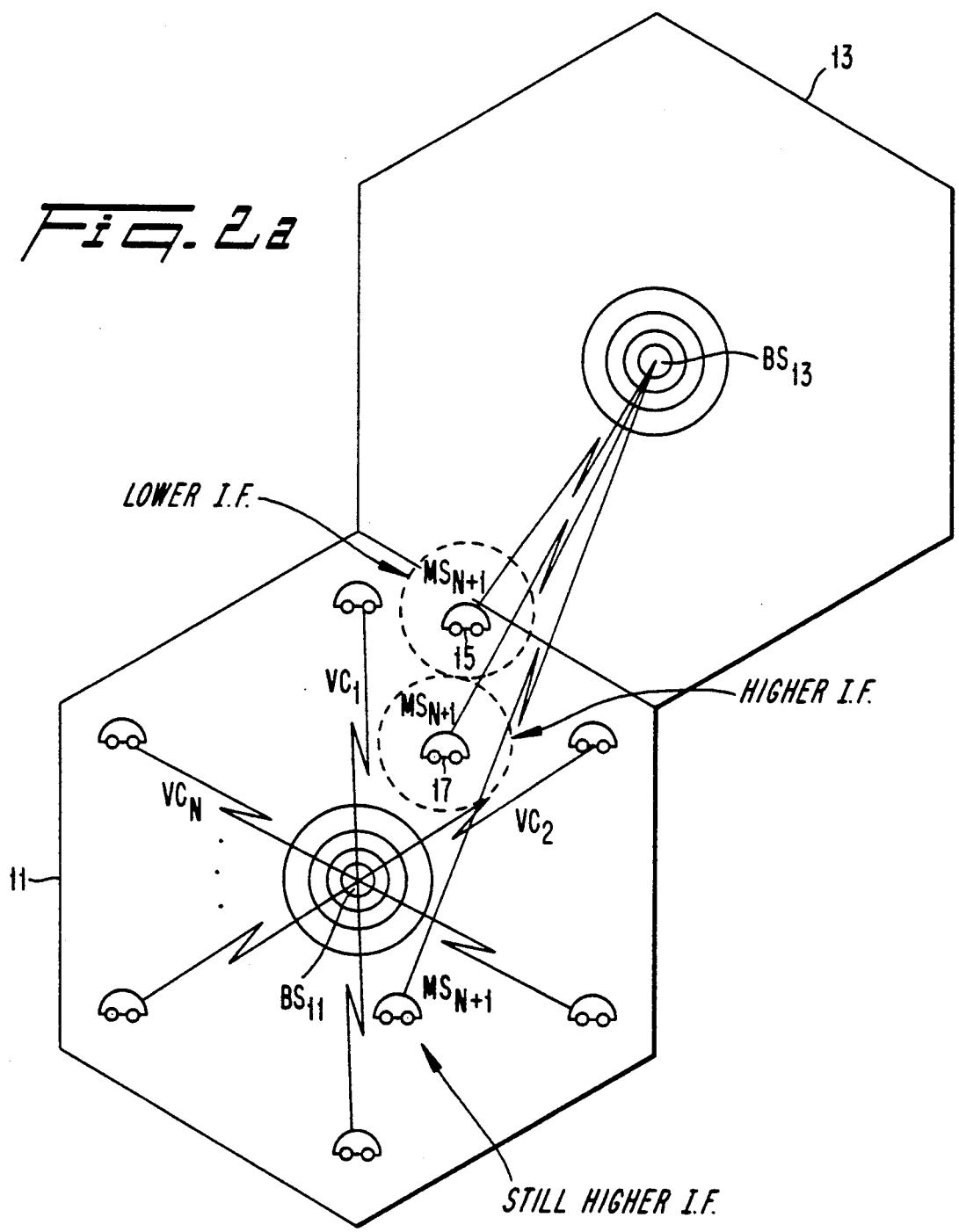
FIG. 2(a) is a representation of interference in a cell caused by unrestricted directed retries.
FIG. 2(b) is a representation of a directed retry message sent from a radio base station to a mobile station at the request of the switching center.

Referring now to FIG. 2(a), a cell such as cell 11 of a cellular mobile radiotelephone system experiences congestion when it receives a service request from a mobile station at a time when all of the voice channels of the cell are occupied. Assuming all of the available voice channels 1—N of the cell 11 are occupied by mobile stations $MS_{1-N}$, N representing a maximum number of channels of the cell 11, congestion is experienced when the cell 11 receives a new call access or service request from a mobile station $MS_{N+1}$. The mobile station may be located near the periphery of the cell as in the case of mobile station 15 or the mobile station may be located near the interior of the cell 11 as in the case of mobile station 17. In either case, the mobile switching center (not shown) in a conventional cellular mobile radiotelephone system will send to the mobile station 15 or 17 a directed retry message as illustrated in FIG. 2(b) instructing that mobile station to try access at a different cell.

Referring to that figure, the directed retry portion of a mobile station control message may consist, for example, of two identical 40-bit words divided into segments as illustrated in the figure. The message preamble consists of four bits, two bits $T_1T_2$ identifying the word as either a single-word message, the first word in a multi-word message or a second or higher word in a multi-word message. The following two bits SCC may be used elsewhere in the message to designate a SAT (supervisory audio tone) color code as is well-known in the art, but in the illustrated directed retry portion of the message, these bits are ignored. The message postamble contains three reserved bits RSVD and a 12-bit parity field P. The main portion of the message, consisting of three 7-bit segments, identifies three channels of three different neighboring cells in terms of a channel position offset CHPOS relative to a first access channel. Although not illustrated, a second word of the directed retry portion of the message assumes the same form as the first word, but identifies three additional potentially available channels for a total of six. In response to the directed retry message, the mobile station monitors received signal strengths on each of the identified channels and selects the strongest received channel to reattempt its previous service access request.

In an ideal radio environment, the channel selected in response to the directed retry message would always be that of the neighboring cell nearest the mobile station, i.e., cell 13 in the example of FIG. 2(a). If located near the periphery, the mobile station will usually not cause major local interference. If located near the interior, however, the probability is much greater that the mobile station will create significant local interference. As a result other ongoing calls in the cell may be audibly disturbed.

Because of numerous obstacles to radio transmission, the channel selected will not always be that of the neighboring cell closest to the mobile station. Accordingly, it sometimes occurs that the mobile station will retry cross-cell with the result that a new call is established with a mobile station located far from the assigned area of the cell handling the call. In such an instance, the possibility for disruptive interference is at its greatest.

Figure 3:
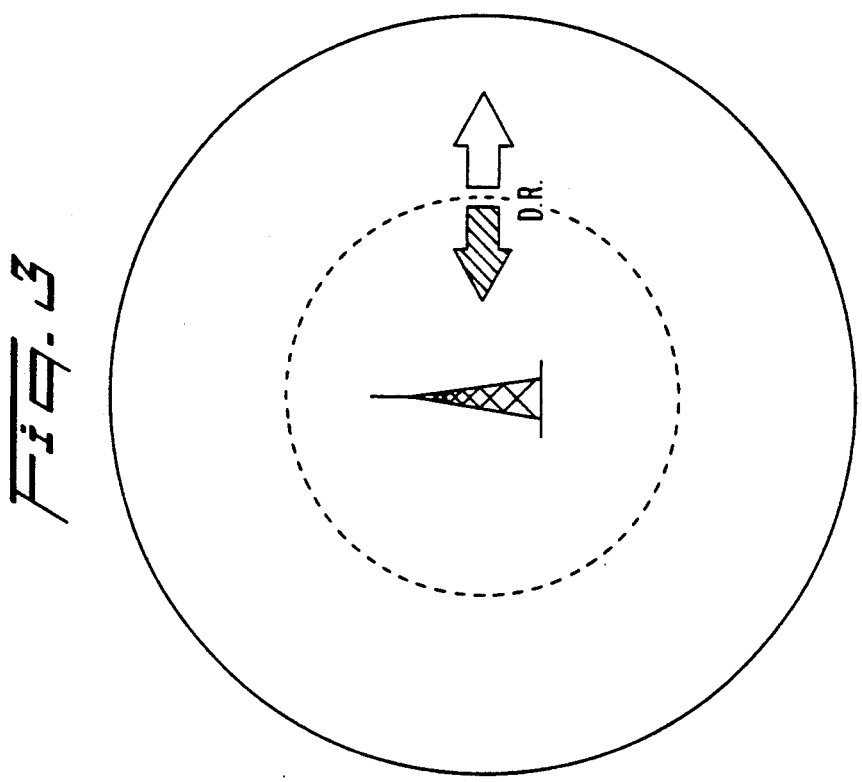
FIG. 3 is a representation of how a cell may be partitioned for purposes of directed retry so as to reduce interference.

Referring to FIG. 3, this type of interference in congested cells may be reduced by partitioning the cell into two or more different areas, illustrated as concentric but not necessarily so, for purposes of directed retry. To reduce potential interference in areas near the interior of the cell, directed retries are prohibited or tightly restricted. In the areas near the periphery of the cell, directed retries are freely allowed or less tightly restricted. The actual location in the cell of the requesting mobile station is determined by measuring the mobile's signal strength during its service access request.

Figure 4:
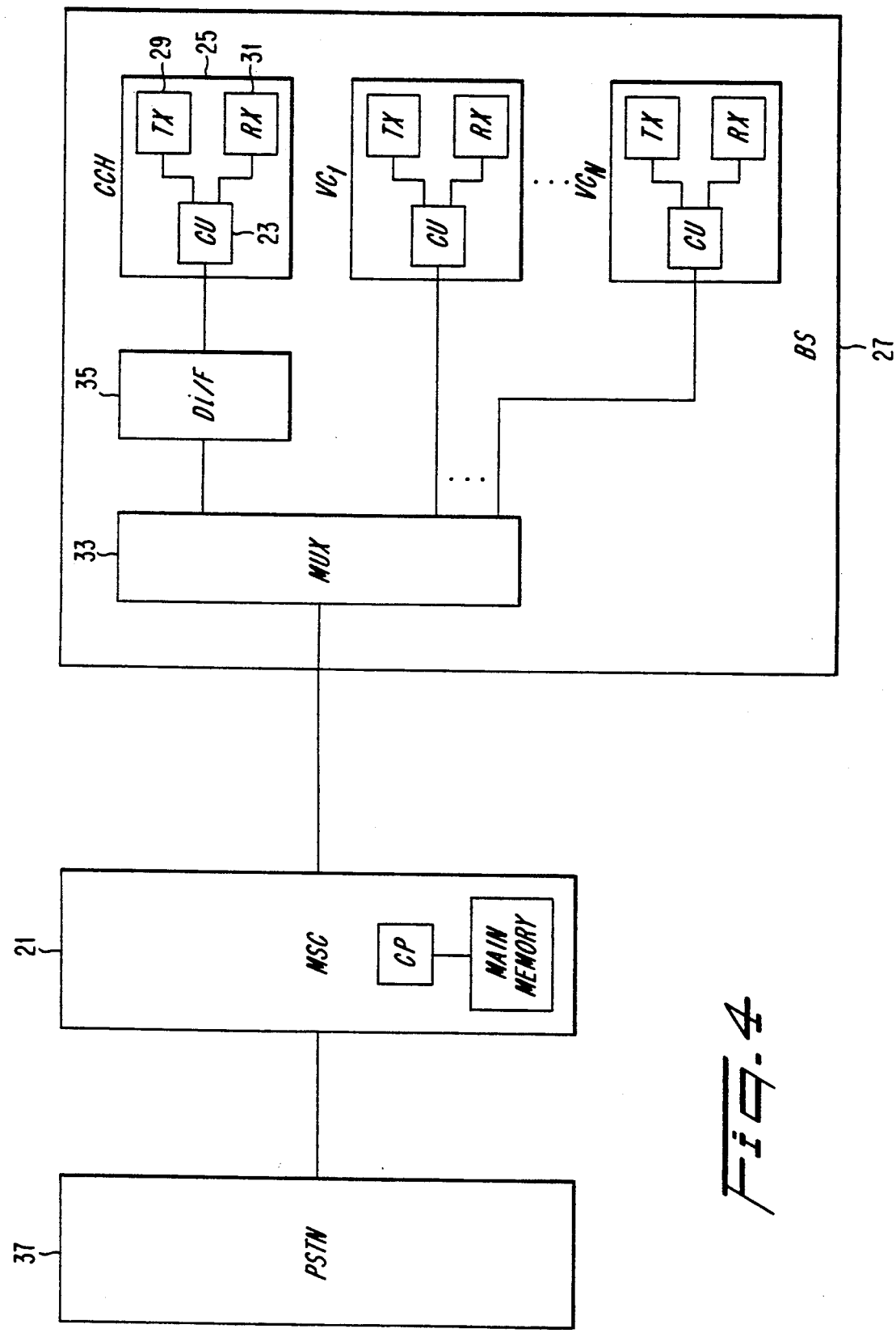
FIG. 4 is a block diagram of part of a cellular mobile radiotelephone system that may be used to implement the present invention.

Referring to FIG. 4, the determinations of congestion in a cell are made by the mobile switching center MSC 21 serving that cell. The mobile switching center MSC 21 includes a central processor CP and a main memory. Measurements of signal strength during service requests are performed by the control unit CU 23 of the control channel CCH 25 of the cell's base station BS 27. The control unit CU 23 controls a radio transmitter TX 29 and a radio receiver RX 31, the three units together realizing a radio channel. In addition to the control channel CCH 25, a number of voice channels $VC_1$ to $VC_N$ are also provided. Communications on the voice channels are multiplexed directly to and from the switching center MSC 21 through a multiplexer MUX 33. Communications between the control channel CCH 25 and the switching center MSC 21 are formatted by a digital interface Di/F 35. The switching center MSC 21 is connected to the public telephone switching network PTSN 37.

The system of FIG. 4 has been described generically, inasmuch as the present invention may be applied with equal facility to analog, dual-mode, and digital cellular systems.

Referring to FIG. 5, a routine executed by the mobile switching center MSC according to the present invention when congestion is detected in the cell will now be described. During the first step S1, a determination is made whether or not it is necessary to compensate the signal strength measured during the access attempt. Since the power output of the mobile station depends both on its power class, determined by the maximum output power of the mobile station, and the power level allowed in the cell, it is generally necessary to compensate the signal strength measured during the service access attempt for different power levels and to arrive at a measure of the signal path loss. "Path loss" describes the attenuation of the mobile station's radio signal during propagation from the mobile station to the base station. An indication of the distance of the mobile station from the base station is thereby obtained.

Table 1 below shows the output power of a mobile station operating at different power levels according to any of three common mobile radiotelephone specifications, namely TACS, EIA 553, and EIA IS-54, power output being measured in dBW ERP (effective radiated power). As seen in the table, the identified specifications encompass five different power classes, a highest power class I occurring in the TACS specification and a lowest power class IV occurring in the EIA IS-54 specification. The intermediate three power classes (2, 3 and 4 in the TACS specification and I, II and III in the EIA specifications) are identical. A mobile station identifies itself by power class to the base station during a service request. The specification used in a particular system is known in advance by both the mobile stations and the land stations. The allowed power level in a cell is transmitted during filler messages on the control channel of each base station, and a mobile station sets its transmission power to the allowed level at the beginning of an access request.

TABLE 1

Mobile output power (in dBW ERP) as a function of system specification, PC and PL.

| | | POWER CLASS — PC | | | |
|---|---|---|---|---|---|
| TACS | | 1 | 2 | 3 | 4 |
| EIA 553 | | | I | II | III |
| EIA IS-54 | | | I | II | III | IV |
| POWER LEVEL — PL | 0 | 10 | 6 | 2 | −2 | −2 |
| | 1 | 2 | 2 | 2 | −2 | −2 |
| | 2 | −2 | −2 | −2 | −2 | −2 |
| | 3 | −6 | −6 | −6 | −6 | −6 |
| | 4 | −10 | −10 | −10 | −10 | −10 |
| | 5 | −14 | −14 | −14 | −14 | −14 |
| | 6 | −18 | −18 | −18 | −18 | −18 |
| | 7 | −22 | −22 | −22 | −22 | −22 |
| | 8 | | | | | −26 |
| | 9 | | | | | −30 |
| | 10 | | | | | −34 |

Power measurement during access requests may be normalized by adding to the measured signal strengths a constant determined according to specification, power class and power level as set forth in Table 2 below. The signal strength compensation values listed in the table may be changed by adding to or subtracting from each of the values an arbitrary number without affecting the normalization operation. In other words, no special significance should be attached to the particular numbers in Table 1 themselves; what is important is the relative difference between the various values. Although only three mobile radiotelephone specifications are listed, other specifications may of course be treated in a similar fashion. It will be observed that when the corresponding values in Tables 1 and 2 are added, a constant number (10) is obtained in each instance. By normalizing the measured signal strengths it is therefore as if each mobile were to transmit always at the same power regardless of power class and power level.

TABLE 2

Compensation values as a function of system specification, PC and PL.

| | | POWER CLASS — PC | | | |
|---|---|---|---|---|---|
| TACS | | 1 | 2 | 3 | 4 |
| EIA 553 | | | I | II | III |
| EIA IS-54 | | | I | II | III | IV |
| POWER LEVEL — PL | 0 | 0 | 4 | 8 | 12 | 12 |
| | 1 | 8 | 8 | 8 | 12 | 12 |
| | 2 | 12 | 12 | 12 | 12 | 12 |
| | 3 | 16 | 16 | 16 | 16 | 16 |
| | 4 | 20 | 20 | 20 | 20 | 20 |
| | 5 | 24 | 24 | 24 | 24 | 24 |
| | 6 | 28 | 28 | 28 | 28 | 28 |
| | 7 | 32 | 32 | 32 | 32 | 32 |
| | 8 | | | | | 36 |
| | 9 | | | | | 40 |

TABLE 2-continued

Compensation values as a function of system specification, PC and PL.

| 10 | 44 |
|---|---|

Referring again to FIG. 5, the signal strength measured during the mobile stations service access request is compensated if necessary (step S3) by an amount $SS_{adj}$ as determined from a table like that of Table 2. Thereafter, the adjusted signal strength is compared with a signal strength threshold $SS_0$ (step S5). If the adjusted signal strength is greater than $SS_0$, then the mobile station may be adjudged to be in the interior of the cell (indicating the need for care to be taken to avoid undue interference); else, if the adjusted signal strength is less than $SS_0$, then the mobile station may be adjudged to be near the periphery of the cell. Different channel lists are maintained for each of the two areas, and depending on the result of the comparison step S5, a first list LIST1 is used (step S9) if the threshold $SS_0$ is exceeded, else a second list LIST2 is used if the threshold $SS_0$ is not exceeded. In order to prohibit directed retries near the interior of the cell but freely allow directed retries near the periphery of the cell, for example, LIST 1 used in the event that the threshold $SS_0$ is not exceeded would contain the channels of all of the congested cells neighboring cells and LIST2 used in the event that the threshold $SS_0$ is exceeded would be empty.

Rather than inflexibly fixing the contents of the lists, however, the lists may instead be adjusted according to prevailing cell conditions. For example, if cell-wide interference levels are generally greater than would normally be permitted, directed retries may be disallowed altogether such that both of the lists would be empty. If a directional indication of the mobile station's location is available, then although the mobile station may not be at the periphery of the cell, retries may nevertheless be allowed except for cross-cell retries.

The contents of the lists may also be adjusted so as to control traffic in adjacent cells. A particular one of the cells adjacent to a cell in which access is being attempted may have very good coverage over that cell. As a result, most of the mobile stations given directed retry commands will lock onto this particularly strong adjacent cell. Such an occurrence will not just increase interference but will cause congestion in the strong adjacent cell. Referring again to FIG. 1, for example, cell $A_1$ may often be congested so that directed retry is used, cells $A_2$, $A_6$, $A_7$, $B_3$, and $B_4$ normally being designated in a directed retry message. All of the latter cells have some coverage in the area of cell $A_1$. Cell $B_4$, however, may have the strongest coverage of the adjacent cells over most of the area of cell $A_1$. The majority of the overflow traffic from cell $A_1$ will therefore tend to end up in cell $B_4$, causing it to become unnecessarily congested. By withdrawing cell $B_4$ from one or more lists, the overflow traffic of cell $A_1$ may be spread to other adjacent cells besides cell $B_4$. Such withdrawal may be done automatically, based for example on congestion in the cells, or manually by an operator or radio network engineer.

Figure 1:
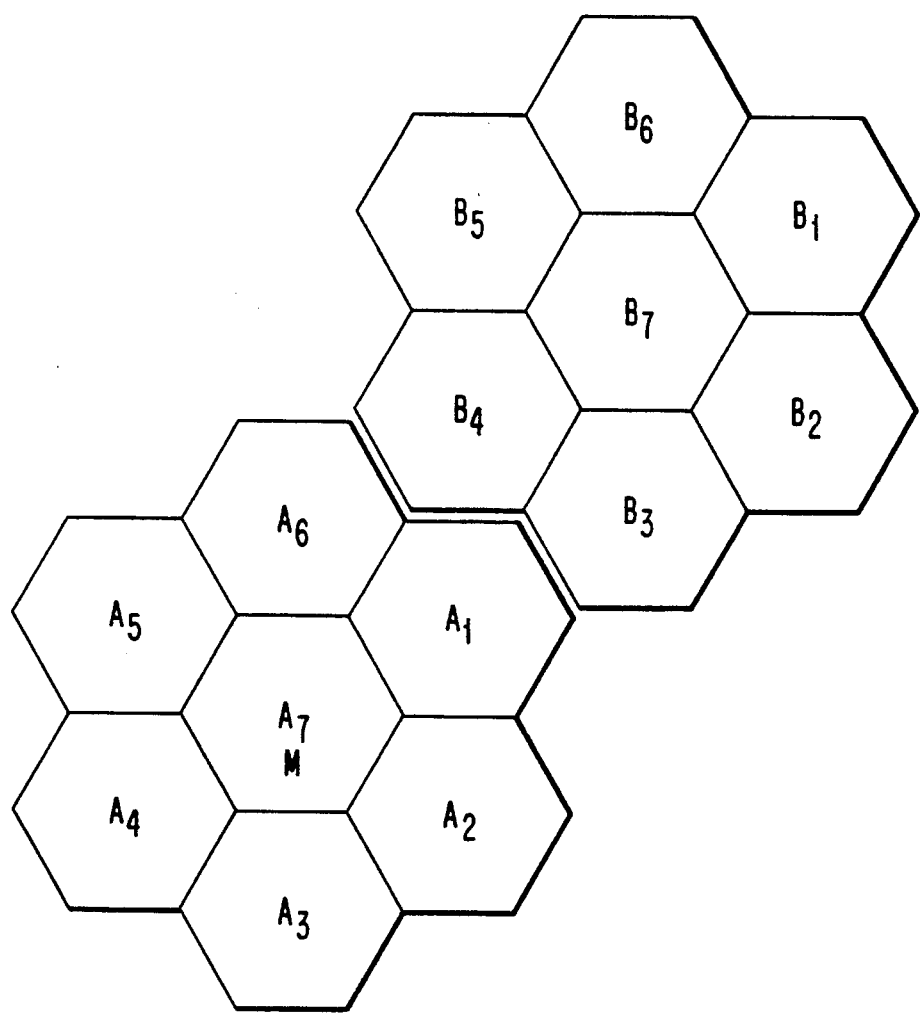
FIG. 1 is a cell plan illustrating frequency reuse.

Depending on available network resources, composition of the lists may be determined using advanced analytical techniques. In the Ericsson CMS 88 cellular mobile telephone system, a cell traffic recording function records most events occurring in the course of a call including call set-up, directed retry, handoff and disconnection. By comparing events in co-channel cells (non-adjacent cells using the same transmission frequency), for example, trends may be detected and causative links may be established between call set-up after directed retry in one cell and bad quality or dropped calls in co-channel cells. Referring to FIG. 1, experience may have shown that cell $A_4$ is a bad choice for directed retry in the case of a mobile station as far away from the normal service area of cell $A_4$ as mobile station M. Cell $A_4$ should therefore be excluded from the list of possible directed retry candidates for mobile station M. Although cells $A_2$ and $A_3$ may be as far away as cell $A_4$, the interference resulting from a connection with these cells may have been demonstrated to be lower.

Although only two lists are illustrated, the present invention may be adapted to include three or more lists in a manner that will be evident to those of ordinary skill in the art. In other words, the cell may be partitioned into three or more areas, with separate directed retry candidate cell lists being maintained for mobile stations in each of the three or more areas.

So long as the selected list is not empty as determined in step S11, a directed retry message is then sent to the mobile station in step S13, including in the message the channels found in the selected list. If the selected list is empty, a determination is made in step S15 whether the access request is an originating call request (a call from a mobile in the cell) or a termination call request (a call to a mobile in the cell). In other words, an access request may be independently initiated by a mobile station or may be made by a mobile station in response to a page by a base station. If an access is a terminating call request and the selected list is empty, the mobile station is simply instructed in step S19 to release the call. In this instance, since no actual call has been established, the owner of the terminating mobile station remains unaware that any call to him has been attempted, and no further action is necessary. If the request is an origination request and the list is empty, a reorder message is sent to the mobile station in step S17 whereby the mobile subscriber is informed that service is temporarily unavailable. The reorder message may cause a "fast busy" tone to be produced by the mobile station, encouraging the subscriber to try again.

An alternative to not sending any directed retry message in the case of a null set is to send a directed retry message identifying only the cell sending the message as a candidate for directed retry. The mobile station will then make another access attempt to the same cell without requiring any action on the part of the subscriber. Measurements have shown that approximately two seconds usually elapses between the time a directed retry message is sent in response to a first access attempt and the time of a second access attempt in response to the directed retry message. More often than not, the cell will still be congested, but in the intervening two seconds, a channel will have become available in a sufficient number of instances to make such a technique worthwhile. This technique could be further enhanced by deliberately delaying the transmission of the directed retry order from the base station for a few seconds in order to increase the probability that a voice channel will have become available by the time a retry is made. Since the mobile station expects a response within five seconds, the delay must be shorter than that.

By selectively controlling the permissible channels for directed retry sent in a directed retry message based on the position of the mobile station, fewer call connections are established by mobile stations located in one cell but associated with distant neighboring cells. As a result, interference levels may be improved.

It will be appreciated by those of ordinary skill in the art that the present invention can be embodied in other specific forms without departing from spirit or essential character thereof. The presently disclosed embodiments are therefore considered in all respects to be illustrative and not restrictive. The scope of the invention is indicated by the appended claims, rather than the foregoing description, and all changes which come within the meaning and range of equivalents thereof are intended to be embraced therein.

What is claimed is:

1. A method of controlling communications with a mobile station in a radiotelephone network, comprising the steps of:
   receiving a service request from said mobile station at a base station;
   measuring at said base station the signal strength of a signal from said mobile station during said service request;
   ascertaining whether said service request can be accepted based on the availability of voice channels assigned to said base station and, if said service request cannot be accepted;
   comparing said signal strength with at least one threshold value; and
   directing said mobile station to retry said service request on one or more of a first set of channels if said signal strength exceeds said threshold value; and otherwise directing said mobile station to retry said service request on one or more of at least a second set of channels.

2. The method of claim 1 wherein the channels in said first and second sets are variable.

3. The method of claim 1 wherein said threshold value is variable.

4. The method of claim 1 wherein said signal strength is compared with a plurality of threshold values and said mobile station is directed to retry said service request on one or more channels of one of a number of sets of channels, said number of sets being one more than said plurality of threshold values.

5. The method of claim 1 wherein one or both of said first and second sets is a null set, in which case said mobile station is directed, before more than several seconds have elapsed, to retry said service request to said base station.

6. The method of claim 1, further comprising the step of: normalizing said measured signal strength to account for actual transmission power of said mobile station, said normalized measured signal strength being indicative of a distance of said mobile station from said base station.

7. The method of claim 1 wherein said measured signal strength is normalized after said measuring and before said comparing.

8. An apparatus for controlling communications with a mobile station in a radiotelephone network, comprising:
   means for receiving a service request from said mobile station at a base station;
   means for measuring at said base station the signal strength of a signal from said mobile station during said service request;

means for ascertaining whether said service request can be accepted based on the availability of voice channels assigned to said base station;

means, responsive to a determination by said means for ascertaining that said service request cannot be accepted, for comparing said signal strength with at least one threshold value; and means, responsive to said comparing means, for directing said mobile station to retry said service request on one or more of a first set of channels if said signal strength exceeds said threshold value, and otherwise, for directing said mobile station to retry said service request on one more of at least a second set of channels.

9. In a cellular mobile radiotelephone system having a plurality of cells and a plurality of mobile stations, a method of reducing interference in said system of a call made by a mobile station when setting up said call within a congested cell, comprising the steps of:

obtaining an indication of said mobile station's location relative to a probability of interference with established calls by setting up said call in said congested cell;

freely allowing said mobile station to retry setting up said call in at least one neighboring cell when said mobile station is indicated as being located in an area of said congested cell where interference with established calls by the setting up of said call is likely to be small; and restricting said mobile station from retrying setting up said call when said mobile station is indicated as being located in an area of said congested cell in which interference with established calls by the setting up of said call is likely to be greater.

10. The method of claim 9 wherein said obtaining step comprising the steps of:

measuring, at a base station, said congested cell signal strength of a signal transmitted by said mobile station on a control channel of said base station; and normalizing said measured signal strength to account for actual transmission power of said mobile station, said normalized measured signal strength being indicative of a distance of said mobile station from said base station.

11. The method of claim 10, wherein said obtaining step further comprises the step of comparing said normalized signal strength to a threshold value.

12. The method of claim 9, wherein said step of freely allowing said mobile station to retry said call comprises the step of sending a directed retry message to said mobile station listing a first set of candidate cells for retry of said call.

13. The method of claim 12, wherein said step of restricting retry by said mobile station of said call comprises the step of sending a directed retry message to said mobile station listing a second set of candidate cells different from said first set for retry of said call.

14. The method of claim 12, wherein said second set is a null set.

15. In a cellular mobile radiotelephone system having a plurality of cells and a plurality of mobile stations, an apparatus for reducing interference in said system of a call made by a mobile station when setting up said call within a congested cell, comprising:

means for locating said mobile station relative to a probability of interference with established calls by setting up said call in said congested cell;

means for allowing said mobile station to retry setting up said call in at least one neighboring cell when said mobile station is located in an area of said congested cell where interference with established calls by the setting up of said call is likely to be small; and means for restricting said mobile station from retrying setting up said call when said mobile station is located in an area of said congested cell where interference with established calls by the setting up of said call is likely to be greater.

16. The apparatus of claim 15, wherein said means for locating comprises:

means for measuring, at a base station, said congested cell signal strength of a signal transmitted by said mobile station on a control channel of said base station; and means for normalizing said measured signal strength to account for actual transmission power of said mobile station, said normalized measured signal strength being indicative of a distance of said mobile station from said base station.

17. The apparatus of claim 16, wherein said means for locating further comprises means for comparing said normalized signal strength to a threshold value.

18. The apparatus of claim 15, wherein said means for allowing said mobile station to retry said call comprises means for sending a directed retry message to said mobile station listing a first set of candidate cells for retry of said call and means for storing a list of said candidate cells in said first set.

19. The apparatus of claim 18, wherein said means for restricting retry by said mobile station of said call comprises means for sending a directed retry message to said mobile station listing a second set of candidate cells for retry of said call and means for storing a list of said candidate cells in said second set.

* * * * *